UNITED STATES PATENT OFFICE.

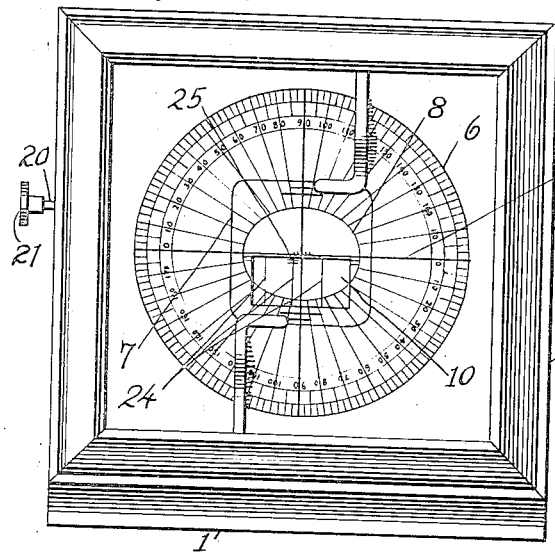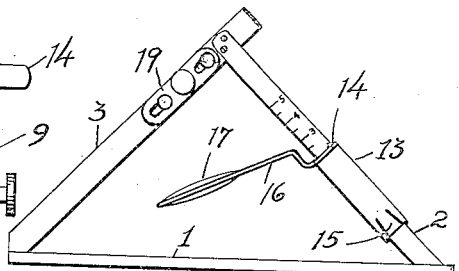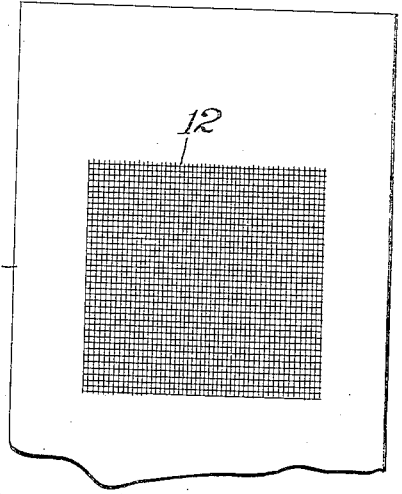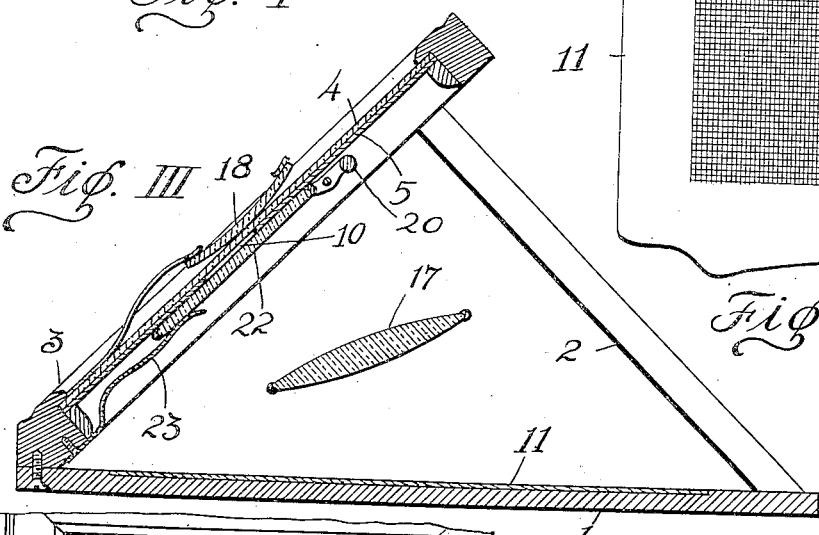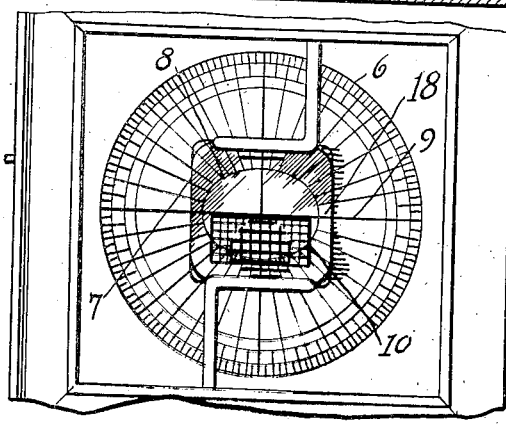

HENRY B. MATHEWSON, OF SAN FRANCISCO, CALIFORNIA, ASSIGNOR TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

1,336,040.  Specification of Letters Patent.  Patented Apr. 6, 1920.

Application filed December 11, 1916. Serial No. 136,269.

*To all whom it may concern:*

Be it known that I, HENRY B. MATHEWSON, a citizen of the United States, residing at San Francisco, in the county of San Francisco and State of California, have invented certain new and useful Improvements in Lens-Testing Instruments, of which the following is a specification.

This invention relates to improvements in lens testing instruments, and has particular reference to an improved instrument for use in bifocal work.

One of the leading objects of the present invention is the provision of an improved instrument on which a bifocal or multifocal lens may be readily laid out in a rapid and efficient manner.

Another object of the present invention is the provision of an instrument in which the center, outline, etc., as desired, of the lens may be laid out without the necessity for primarily dotting around the dividing line on the bifocal and moreover of an instrument in which the exact position of the axis, optical center, etc., of a bifocal mounted or unmounted may be quickly and readily determined at any time.

A further object of the present invention is the provision of an improved instrument of the protractor type which may be quickly set to accommodate differing powers of lenses.

Other objects and advantages of my improved construction should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a front view of my improved instrument.

Fig. II represents a side elevation thereof.

Fig. III represents a central sectional view.

Fig. IV represents a view similar to Fig. I showing a lens in position.

Fig. V represents a plan view of the chart in the base.

In the drawings, in which similar characters of reference are employed to denote corresponding parts throughout the several views, the numeral 1 represents the base of my instrument having rising therefrom the standards or supports 2, supporting one end of the frame 3, which has its other end resting on the base, disposing it at a suitable working angle to the base, it being understood, however, that the base and frame 3 may be parallelly disposed if preferred, or in other desired relationship to each other.

Said frame 3 has mounted therein, as is most clearly illustrated in Fig. III, the glass plate or table portion 4 on the underside of which is disposed the protractor sheet 5, being provided with the usual circular degree protractor portion or marking 6, with the blank outline 7 adapted to conform to the ordinary shape in which a bifocal blank may be furnished, and being in addition provided with an indication 8, the general shape of a finished lens, these several designations being common to bifocal protractors and being such as are commonly employed in laying out lenses and the features just mentioned forming no essential part of my invention.

Extending centrally across the protractor is the horizontal axis line 9, while the portion of the protractor sheet 5 disposed immediately forwardly or below the axis 9 is cut away to provide the aperture 10, certain of the configurations, such as the lower part of the lens outline 8 and some of the radiating lines of the protractor above the aperture being etched or suitably formed on the table 4 for the guidance of the operator.

Mounted on the base 1 and visible through the aperture 10, as is clearly illustrated in Figs. I and IV, is the chart member 11 bearing the series of vertical and horizontal lines 12, splitting the visible portion of the chart up into a large number of small squares.

Slidable upon one of the supports 2 is a sleeve 13 having the handle or operating portion 14 and the spring finger 15 engaging the standard to serve as a frictional brake, holding the sleeve in desired adjusted position, while secured to the sleeve and extending diagonally inwardly therefrom is the arm 16 bearing the compensating or focusing lens 17.

In the use of my improved construction the lens blank 18 is placed on the table 4 with the presumed bifocal portion thereof above the aperture 10 and the center dot for the distance portion of the lens placed in desired relation to the chart or protractor and the axis of the lens likewise suitably located. To then insure correct positioning of the bifocal portion of the lens it is merely necessary to look at the lens through the aperture 10, when the bifocal portion will be clearly outlined through the difference in magnification of the squares on the chart 11, as is clearly illustrated in Fig. IV. In the event that the squares are not distinctly visible it is merely necessary to adjust the sleeve 13 and thus the compensating lens 17 to compensate for the power of the lens in question so that the squares will be brought into proper focus.

As will be understood by those familiar with the art of laying out bifocal lenses on protractors or the like, it is frequently desirable to decenter the bifocal or reading addition inwardly to accommodate the convergence of the wearer and to place the center above or below usual position and to exactly control the position of the upper edge of the dividing line. To facilitate the accomplishment of these several results I preferably slidably mount on the sides of the frame 3 the plate 19 bearing the rod 20 provided with the manipulating handle 21. This rod, as is best understood by reference to Figs. I and III, bears the supplemental transparent plate 22 extending across on the under side of the aperture 10 and being held in desired transversely and vertically adjusted position as by the spring or resilient locking member 23. This plate 22 is provided with the suitable lateral measurement lines 24 and cross lines 25.

It is to be noted that the rod 20 is slidable through the guide plate 19, while the plate 19 together with the rod 20 are slidable back and forth along the frame as a guide, and consequently it is possible to position the transparent member 22 at any desired point beneath the aperture 10. In this manner the lateral lines 24 and cross lines 25 may be positioned to the exact point relative to the protractor at which it is desired to position the bifocal segment, in laying out the bifocal it then being merely necessary to position the distance portion as desired on the protractor, holding the lens as an entirety in that position to swing or shift the same until the segment is found to properly overlie the member 22 and to then mark out on the lens the desired geometrical axis, guiding point, or shape of the lens guided by the form line 8 or other desired guiding mark.

From the foregoing description taken in connection with the accompanying drawings the construction, operation and advantages of my improved instrument for facilitating the laying out of bifocals should be at once apparent, and it will be seen that the lens may be directly placed on my improved device without any preliminary laying out or marking, that the several designations necessary for laying out the final form of the lens may be quickly determined and the exact position of the bifocal segment readily perceived at all times and without the difficulties attendant upon marking out and afterward erasing the outline of the segment, as has hitherto been deemed necessary in order to produce most accurate results.

It will further be understood that as indicated in the drawings, I may if desired provide suitable retaining clips or the like for securing the lens in position upon the table 4 and thus eliminate the necessity of holding the same.

I claim:

1. A device of the character described, including a transparent table and a chart beneath the table, whereby the image of the chart may be seen through a lens on the table, and a transparent indicator adjustably mounted adjacent the table to facilitate desired positioning of the lens on the table.

2. A bifocal protractor comprising a table having a transparent aperture and a protractor surrounding the aperture, the position of the aperture corresponding with the normal position of the segment of a bifocal disposed in normal position on the protractor, a chart beneath the table and visible through the segment and adjacent portion of the lens to be tested by way of the transparent aperture in the table, and an adjustable portractor member movable relative to the segment of the lens on the table and bearing configurations relating particularly to the laying out of the segment.

3. An instrument for laying out bifocal lenses, including a bifocal protractor having a portion removed and a chart spaced from the protractor and visible through the aperture therein, and a supplemental segment protractor adjustably supported relative to the main protractor and shiftable to correspond to the desired decentration or shifting of the segment.

4. A device for laying out bifocal lenses, including a protractor having the segment portion of transparent form, a supplemental segment indicator of transparent material, means for adjusting the supplemental protractor relative to the main protractor, and a chart visible through the transparent portions of the main and supplemental protractors to facilitate the positioning of the bifocal.

5. A bifocal protractor including a main portion and a supplemental laterally shiftable segment indicator.

6. In a device of the character described, the combination with a protractor table having an aperture formed therein, of means carried by the table for securing a lens in position thereon with a portion overlying the aperture, a chart suitably supported beneath and visible through the aperture, and an adjustable transparent segment guide carried by the table and movable beneath the aperture for aiding in laying out the lens.

7. An instrument for laying out bifocal lenses, including a bifocal protractor having a portion removed, a chart spaced from the protractor and visible through the aperture therein, and a supplemental laterally shiftable segment indicator as and for the purpose set forth.

8. A bifocal protractor comprising a table having a transparent aperture and a protractor surrounding the aperture, a supplemental segment indicator adjustable relative to the main protractor, means for retaining said segment indicator in an adjusted position, a chart beneath the table and visible through the segment indicator and an adjacent portion to the lens to be tested by way of the transparent aperture in the table.

9. A device of the class described including a protractor having an aperture therein, a bifocal lens on the protractor having a portion overlying the aperture, a chart and an adjustable compensating lens serving in connection with the reading portion of the bifocal lens to accurately focus the lens therethrough but to throw it out of focus with respect to the distance portion of the bifocal lens.

10. A device of the character described including a standard bifocal protractor having a transparent portion, a mesh type target visible through the transparent portion and a compensating lens intermediate the target and protractor.

11. A device for use in laying out bifocal lenses comprising a bifocal protractor having a transparent portion, a table support for the protractor and a target member held in predetermined relation to the transparent portion and visible therethrough.

12. A device for use in laying out bifocal lenses comprising a bifocal protractor having a transparent portion, a table support for the protractor, a target member held in predetermined relation to the transparent portion and visible therethrough, and means for holding a lens with the reading portion overlying the transparent portion of the protractor.

13. A device for use in laying out bifocal lenses comprising a bifocal protractor having a transparent portion, a table support for the protractor, a target member held in predetermined relation to the transparent portion and visible therethrough, and an adjustable compensating lens intermediate the target and protractor, substantially as and for the purpose described.

In testimony whereof I affix my signature in the presence of two witnesses.

HENRY B. MATHEWSON.

Witnesses:
W. T. Hess,
H. G. Heyl.